United States Patent
Bhogal et al.

(10) Patent No.: US 8,755,914 B2
(45) Date of Patent: Jun. 17, 2014

(54) METHOD FOR DISCOVERY, VALIDATION AND DELIVERY OF POWER THROUGH A UNIVERSAL POWER CENTER

(75) Inventors: Kulvir S. Bhogal, Fort Worth, TX (US); Gregory J. Boss, American Fork, UT (US); Rick A. Hamilton, II, Charlottesville, VA (US); Alexandre Polozoff, Bloomington, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/566,622

(22) Filed: Aug. 3, 2012

(65) Prior Publication Data

US 2012/0297214 A1 Nov. 22, 2012

Related U.S. Application Data

(62) Division of application No. 13/016,195, filed on Jan. 28, 2011, which is a division of application No. 11/532,412, filed on Sep. 15, 2006, now Pat. No. 7,930,043.

(51) Int. Cl.
*G06F 1/26* (2006.01)

(52) U.S. Cl.
USPC ............................................................ 700/22

(58) Field of Classification Search
USPC ............. 700/286, 297, 298, 22; 713/300, 310
See application file for complete search history.

(56) References Cited

U.S. PATENT DOCUMENTS

| | | | |
|---|---|---|---|
| 5,570,002 A | 10/1996 | Castleman | |
| 6,080,022 A | 6/2000 | Shaberman et al. | |
| 6,459,175 B1 | 10/2002 | Potega | |
| 7,646,107 B2 | 1/2010 | Smith | |
| 2002/0111698 A1 | 8/2002 | Graziano et al. | |
| 2002/0166890 A1 | 11/2002 | Hsuan et al. | |
| 2003/0085621 A1 | 5/2003 | Potega | |
| 2003/0151309 A1 | 8/2003 | Hutton et al. | |
| 2004/0108833 A1 | 6/2004 | Lanni | |
| 2004/0193329 A1 | 9/2004 | Ransom et al. | |
| 2005/0083615 A1 | 4/2005 | Rose | |
| 2005/0192713 A1 | 9/2005 | Weik et al. | |
| 2006/0071558 A1 | 4/2006 | Smith | |
| 2007/0075676 A1 | 4/2007 | Novak | |
| 2007/0225833 A1 | 9/2007 | Menas et al. | |
| 2009/0259867 A1 | 10/2009 | Paniagua, Jr. et al. | |

FOREIGN PATENT DOCUMENTS

| | | |
|---|---|---|
| EP | 1455256 | 9/2004 |
| EP | 1571745 | 9/2005 |
| JP | 05-66864 | 3/1993 |
| JP | 09-23574 | 1/1997 |

(Continued)

OTHER PUBLICATIONS

Office Action dated Sep. 19, 2012 in U.S. Appl. No. 13/016,195.

(Continued)

*Primary Examiner* — Ryan Jarrett
(74) *Attorney, Agent, or Firm* — Lisa Ulrich; Roberts Mlotkowski Safran & Cole, P.C.

(57) ABSTRACT

A system and method of discovery, validation and delivery of power to an electronic device through a universal power center is provided. The method comprises providing a power tip for an electronic device with a unique identification and broadcasting the unique identification to a power center. The method further includes verifying the unique identification and connection location of the electronic device, determining power requirements for the connected electronic device based on the unique identification and connection location, and delivering power to the electronic device based on the determined power requirements.

14 Claims, 4 Drawing Sheets

(56) References Cited

FOREIGN PATENT DOCUMENTS

| | | |
|---|---|---|
| JP | 09-230964 A | 9/1997 |
| JP | 2000-010671 A | 1/2000 |
| JP | 2000-181582 A | 6/2000 |
| JP | 2000-357029 | 12/2000 |
| JP | 2002-281663 | 9/2002 |
| JP | 2003-348757 A | 12/2003 |
| JP | 2004-38292 | 2/2004 |
| JP | 2004-135397 | 4/2004 |
| JP | 2004-254444 A | 9/2004 |
| JP | 2005051922 | 2/2005 |
| JP | 2005-128821 A | 5/2005 |
| JP | 2005-151772 A | 6/2005 |
| JP | 2006-25532 | 1/2006 |
| JP | 2006-146780 A | 6/2006 |
| JP | 2006-230129 A | 8/2006 |
| WO | 0207365 | 1/2002 |
| WO | 02056441 | 7/2002 |
| WO | 2005029243 | 3/2005 |
| WO | 2005088820 | 9/2005 |

OTHER PUBLICATIONS

International Search Report and Written Opinion for PCT/EP2007/058815 dated Jan. 30, 2008.
Final Office Action dated Jan. 17, 2013 in U.S. Appl. No. 13/016,195, 9 pages.
Office Action dated May 21, 2013 in U.S. Appl. No. 13/016,195, 9 pages.
Office Action dated Sep. 12, 2013 in U.S. Appl. No. 13/016,195; 11 pages.

METHOD FOR DISCOVERY, VALIDATION AND DELIVERY OF POWER THROUGH A UNIVERSAL POWER CENTER

CROSS REFERENCE TO RELATED APPLICATIONS

The present application is a divisional application of co-pending U.S. patent application Ser. No. 13/016,195, filed on Jan. 28, 2011, which is a divisional application of U.S. Pat. No. 7,930,043, filed on Sep. 15, 2006, the contents of which are incorporated herein by reference in their entireties.

FIELD OF THE INVENTION

The invention generally relates to a method and system for delivering power to different electronic devices and, more particularly, to a method and system for discovery, validation and delivery of power to different electronic devices through a universal power center.

BACKGROUND

Portable electronic devices such as laptop computers, portable digital assistants (PDAs), etc. are commonly used in business to increase worker productivity, increase communications capabilities and generally increase overall worker efficiency. These same types of devices are also used by countless millions of people for personal use such as to download information from the Internet.

Portable devices are known to be manufactured with different power requirements, even though they may be the same type of device. For example, laptop computers of different models may have different power requirements, depending on the manufacturer's specifications. Even with laptops that have the same power requirements, it is not uncommon for different tips (adapters) to be required for devices manufactured by the same or different manufacturers. This all leads to confusion by the consumer/user and, in many instances, leads the consumer to use the internal power source, e.g., battery, of the device.

Thus, it is not uncommon to use the internal power source, e.g., battery, of the device, whether it is for business or personal use. However, batteries have to be recharged and, in many instances, do not have the required energy to power the device for long periods of times. The powering down of the device unexpectedly, in turn, can lead to loss of information.

Currently, there exists no device that is capable of powering multiple devices of different vendors/models simultaneously, via an external power supply. For example, to connect to the power source, the user must bring a power tip which is designed not only for their portable device, but is also adapted for the particular power source.

However, to meet the needs of the consumer, there exist several universal power supplies on the market. For example, IGO™ Juice™ products, manufactured by Mobility Electronics Inc., are a suite of products that include both AC and DC tip capability. The IGO™ Juice™ suite of products includes multiple removable tips which support a variety of portable electronic devices. To use the IGO™ Juice™ tips, though, users must manually look-up the device in a table and determine the proper tip to use with the device. This, of course, relies on human intervention to determine the power requirements and therefore is prone to mistakes and possible damage to the device. For example, laptop computers may have the same tip (physical) configuration, but a different power requirement (electrical properties). So, a user may find and use a tip that fits that particular laptop computer; however, the polarity of the tip may not be correct. In such a case, upon powering up the laptop computer, the laptop computer may become damaged.

Additionally, using such conventional tips requires the user to transport the power cord and many different tips in order to ensure compatibility with the power source. This is cumbersome and, it is well known that these tips are prone to being lost. Moreover, future specifications are not possible without creating new tips to match those specifications and therefore these types of devices are severely limited in their abilities to supply power to new devices. Furthermore, an unnecessarily large amount of tips are required to power devices that use the same physical dimensional characteristics but different electrical properties.

Accordingly, there exists a need in the art to overcome the deficiencies and limitations described hereinabove.

BRIEF SUMMARY

In a first aspect of the invention, a method of delivering a power supply to a portable electronic device comprises verifying a power requirement for the portable electronic device in response to a broadcast, and supplying the verified power requirement to the portable electronic device.

In another aspect of the invention, the method comprises providing a power tip with a unique identification and broadcasting the unique identification to a power center. The method further includes verifying the unique identification and connection location of the electronic device, determining power requirements for the connected electronic device based on the unique identification and connection location, and delivering power to the electronic device based on the determined power requirements.

In still another aspect of the invention, system comprises a plurality of power cords, each having an adapter with a unique identifier and which is configured to connect to an electronic device. The system further includes a control module. The control module is configured to receive broadcast information from the connected electronic device, access an internal or external database which stores power requirements for a plurality of electronic devices, verify a connection location and power requirements of the electronic device, and control a power supply to the connected electronic device based on the power requirements accessed from the internal or external database.

In yet another aspect of the invention, system comprises a server having a database containing data associated with one or more power requirements of a plurality of different types of electronic devices. At least a hardware and/or software component verifies a connection location and power requirement of any of the different types of electronic devices.

In still another aspect of the invention, a computer program product comprises a computer usable medium having readable program code embodied in the medium. The computer program product includes at least one component to verify a power requirement for the portable electronic device in response to a broadcast and supply the verified power requirement to the portable electronic device.

In still further embodiments, a method for providing a power supply to an electronic device, comprises providing a computer infrastructure. The computer infrastructure is operable to provide any of the method steps described herein.

DETAILED DESCRIPTION

Figure 1:
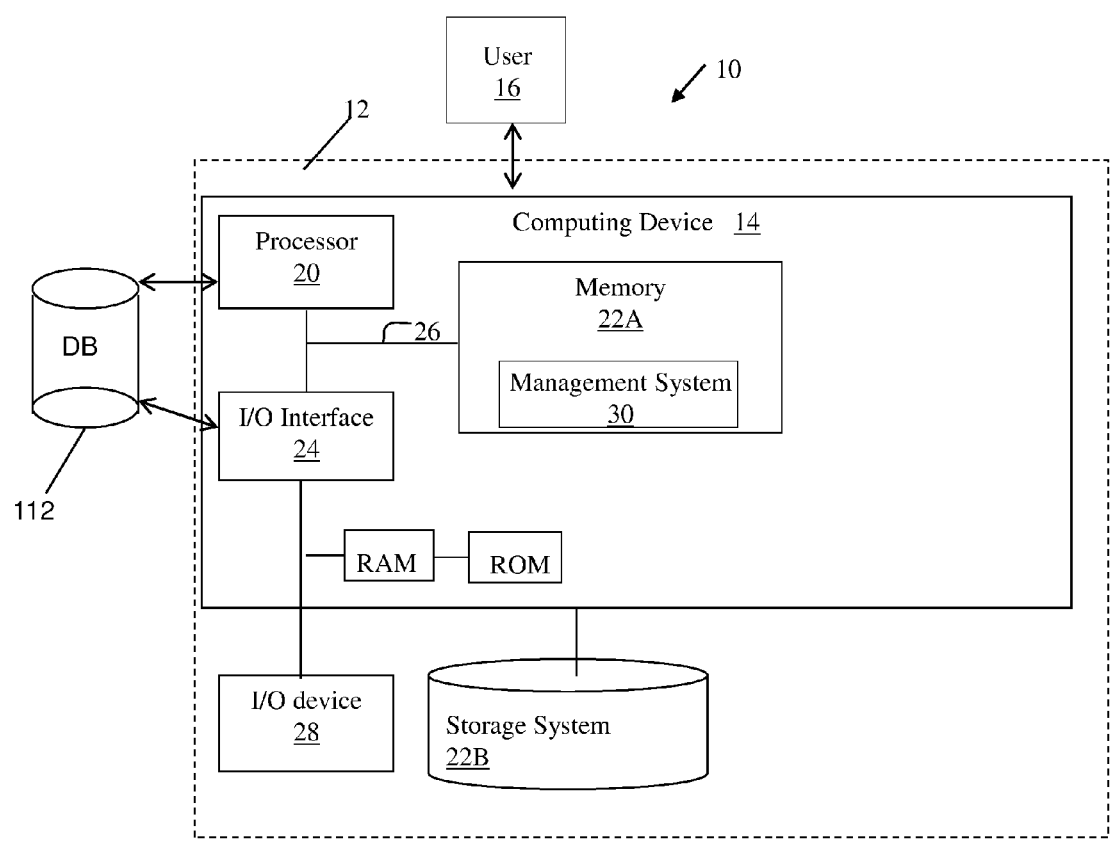
FIG. 1 shows an illustrative environment for implementing the steps in accordance with the invention.

The invention is directed to a method and system for delivering power to portable electronic devices and, more particularly, to a method and system for discovery, validation and delivery of power to different portable electronic devices through a universal power center. That is, the invention introduces negotiation of power requirements, verification of the requirements and supply of those requirements to the portable electronic devices. The invention can be implemented for any number of electronic devices such as, for example, PDAs, cell phones, MP3 players, laptop computers, etc. (generally referred hereinafter as "portable electronic device"). By using the invention, it is possible to support any electronic portable device automatically and without the need for procurement of additional tips. The invention also prevents the user from inserting an incorrect tip into the device thus ensuring that a safe power supply is delivered to the portable electronic device.

In embodiments, the invention includes a universal power center that can access the Internet (using an internal web server, for example) or is accessible via an LCD interface. In embodiments, the universal power center uses universal-type tips which have a unique identifier capable of identifying or pairing the tip with the make and model of the portable electronic device. This allows the universal power center to identify a particular make and model of portable device and determine its exact connection point with the universal power center. Thus, the universal power center, through different mechanisms, as described below, can verify the make and model of the device and its power requirements (and other information) ensuring an adequate and safe power supply. Therefore, pairing and identification of power supplies and portable devices can be accomplished automatically thus ensuring delivery of appropriate voltages and other power requirements to the portable electronic device.

In embodiments, the pairing and identification of tips to portable electronic devices can include:

(1) Publication and Matched Delivery Method;
(2) Validation of Matching Pairs Method; and/or
(3) User Input and Identification Method.

The use of embodiments (1) and (2) may require modifications to the electronic portable device; however, such modifications would be preferable since it will unequivocally avoid power surges and provide a completely automated solution for power delivery. The embodiment (3) would not require modification to the portable electronic device and can be used for legacy devices or those devices which do not have the required circuitry to broadcast their ID or power requirements.

It should be understood by those of skill in the art that any combination of features of (1), (2) or (3) may be combined, as discussed in an example below. It should further be understood that while this disclosure refers to a power center used in a conference room, this same implementation can be applied to other applications. For example, implementations are contemplated for a recreational vehicle, airplane, etc. which may supply power to multiple portable devices such as walkmans, DVD players, LCD screens, etc. In such embodiments, the power conversion is DC to AC; instead of AC to DC.

FIG. 1 shows an illustrative environment 10 for managing the processes in accordance with the invention. To this extent, the environment 10 includes a computer infrastructure 12 that can perform the processes described herein. In particular, the computer infrastructure 12 is shown including a computing device 14 that comprises a management system (e.g., control module) 30, which makes computing device 14 operable to identify, discover, validate and delivery power requirements to electronic devices, e.g., process described herein. The computing device 14 is shown connected to a database 112, which may be internal or external. The database 112 may include verification information and power requirements for various types of portable devices, to name a few benefits.

The computing device 14 also includes a processor 20, a memory 22A, an input/output (I/O) interface 24, and a bus 26. Further, the computing device 14 is shown in communication with an external I/O device/resource 28 and a storage system 22B.

As is known in the art, in general, the processor 20 executes computer program code, which is stored in memory 22A and/or storage system 22B. While executing computer program code, the processor 20 can read and/or write data, such as the validation information, to/from memory 22A, storage system 22B, and/or I/O interface 24. The bus 26 provides a communications link between each of the components in the computing device 14. The I/O device 28 can comprise any device that enables an individual to interact with the computing device 14 or any device that enables the computing device 14 to communicate with one or more other computing devices using any type of communications link.

The computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in other embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in one embodiment, the computer infrastructure 12 comprises two or more computing devices (e.g., a server cluster) that communicate over any type of communications link, such as a network, a shared memory, or the like, to perform the process described herein. Further, while performing the process described herein, one or more computing devices in the computer infrastructure 12 can communicate with one or more other computing devices external to computer infrastructure 12 using any type of communications link. In either case, the communications link can comprise any combination of various types of wired and/or wireless links; comprise any combination of one or more types of networks (e.g., the Internet, a wide area network, a local area network, a virtual private network, etc.); and/or utilize any combination of various types of transmission techniques and protocols. As discussed herein, the management system 30 enables computer infrastructure 12 to manage the identification, discovery, validation and delivery of power requirements to different platforms.

Figure 2:
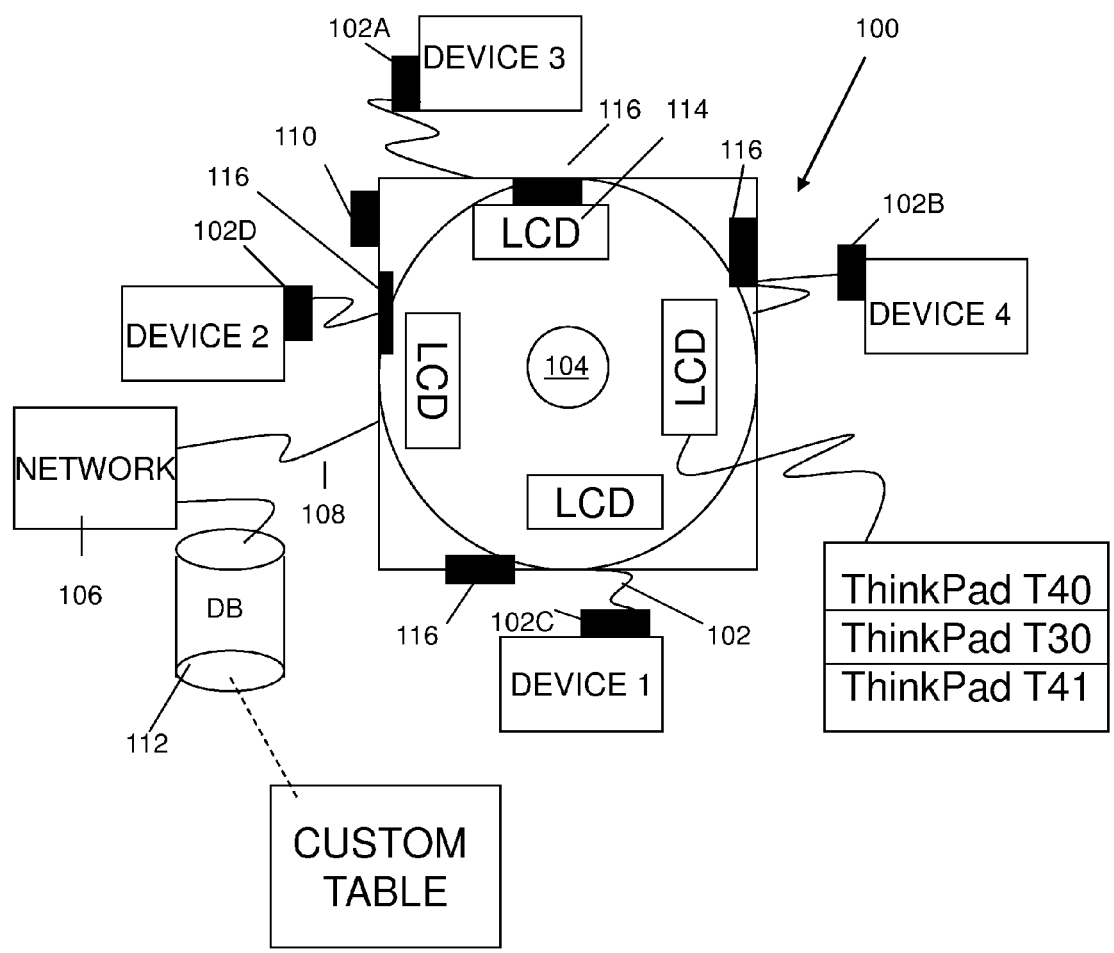
FIG. 2 shows an overview of the universal power center in accordance with embodiments of the invention.

FIG. 2 shows an overview of the power center in accordance with an embodiment of the invention. The power center is generally depicted as reference numeral 100 and, as should be understood by those of skill in the art, can be implemented by the environment of FIG. 1. The power center 100 includes a control module, which is represented by the management system shown in FIG. 1.

In embodiments, the power center 100 further includes a plurality of retractable wires 102 each having a power tip 102a configured for a particular electronic portable device. While the example of FIG. 2 shows four connections to different portable devices, it should be understood by those of skill in the art that the system and method of the invention should not be limited to the exemplary number of connections or types of portable devices. The power center 100 further includes a power tip compartment 104, which houses the power tips 102a.

In the embodiment shown in FIG. 2, which is one of many illustrative examples contemplated by the invention, the specific power tips 102a are configured for different laptop computers such as, for example, the Lenovo Thinkpad T40 (Lenovo and Thinkpad are trademarks of Lenovo in the United States, other countries, or both.) However, it should be recognized by those of skill in the art that the power tips can be used for any number of different portable electronic devices.

In embodiments, the power tips 102a include a unique tip identifier which can be used by the power center 100 to identify a particular make and model (and connection location) of the portable electronic device. This can be used in the verification process, ensuring that the proper power requirements are delivered to the appropriate portable electronic device.

The power center 100 is connected to a network 106 by a network cable 108 or a wireless network link 110, as contemplated with reference to FIG. 1. In embodiments, the network 106 includes an internal or external supported database 112 which can be accessed using the environment described with reference to FIG. 1.

The database 112 can be updatable by connecting to a published web service(s) on the Internet. By doing so, support for new portable electronic devices that come to the market can be added to the database and thus allow the power center 100 of the invention to be compatible with such portable electronic devices. In addition, the user will be able to customize the power delivery such as, for example, if a user does not have a supported portable electronic device, they can define a custom entry.

In embodiments, the invention provides a business method that performs the process steps of the invention on a subscription, advertising, and/or fee basis. For example, in embodiments, the database 112 can be accessed on a subscription, advertising, and/or fee basis. That is, a service provider, such as a solution integrator, could offer to provide the determination and verification of the power requirements of a particular portable device. In this case, the service provider can create, maintain, support, etc., a computer infrastructure such as described in FIG. 1, which performs the process steps of the invention for one or more customers. In return, the service provider can receive payment from the customer(s) under a subscription and/or fee agreement and/or the service provider can receive payment from the sale of advertising content to one or more third parties.

Still referring to FIG. 2, a plurality of interfaces (e.g., LCD displays) 114 may also be associated with the power center 100. The use of the interfaces or LCD displays 114 are discussed in detail below; however, generally, the interfaces or LCD displays 114 allow the user to interface with the power center 100 in order to, for example, select a portable electronic device to be powered. This may be used for any device, including preferably legacy devices.

RF sources 116 are, in embodiments, also contemplated by the invention. As discussed in more detail below, low powered RF sources (e.g., capable of sending a signal to 3 meters) may be associated with each connection location and may be used to identify a location of a particular connected portable electronic device. The electronic portable device may also broadcast its make and model over the RF. In such embodiments, ideally, only one portable electronic device will be within range of a particular RF source in order to transmit its make and model and location to the power center. In this manner, the power center 100 can use this location information to determine which device is connected to which power tip and subsequently verify the make, model and power requirements of the portable electronic device.

Publication and Matched Delivery Method

Still referring to FIG. 1, in embodiments, the portable electronic device is capable of broadcasting its power requirements when a tip 102a is inserted (connected) into the device. This broadcast may be provided in any conventional manner such as, for example, over a wired or wireless (e.g., WIFI, RF, etc.) network. In further embodiments, the broadcast may be performed through the power cable itself. For example, in embodiments, a serial connection may be made to the portable electronic device, where one of the connections (lines) is dedicated to a communication line, for example. The remaining connections (lines) in the serial connection may be dedicated to the power supply. In other embodiments, a simple gate can be used to split the power and communication functions, known to those of skill in the art. The broadcast may include, for example, (i) make and model; (ii) voltage requirements; (iii) amperage requirements; and (iv) power center tip identifier.

In embodiments, as discussed in more detail below, the tip may include a unique identifier associated with the connected portable electronic device, which may be used for verification purposes; that is, to verify that a particular make and model is connected to a certain power tip 102a of the power center 100. More particularly, the identification of the tip will match or pair with a particular make and model of portable device. This identification can then be sent to the power center 100 which, in turn, uses this information to verify the location and power requirements of the connected portable electronic device.

After the requirements and identifier are sent from the connected portable electronic device to the power center 100, the power center 100 can perform one or more of several functions. For example, the power center 100 is configured to verify the make and model of the connected electronic device prior to sending power thereto. This may be accomplished by a look-up table in the database, accessing the device, itself, or verification over the network with a service provider. After such verification, the power center 100 will supply (deliver) the necessary voltage to the specific portable electronic device. In embodiments, this may be based, at least partly, on the identifier of the tip (location of the connection, type and model, etc.).

In an alternative embodiment, the power center, based at least partly on the identifier of the tip (make, model and location of the connection) and broadcast of the portable electronic device, will begin supplying the necessary voltage to the specific portable electronic device. Once a requirement is set, the portable electronic device may change from communication mode to power mode; although, it is contemplated that the portable device may remain in both modes.

In embodiments, the power center 100 can connect to the internal or external supported database 112 to determine and verify the required power source and other requirements needed for the connected portable electronic device. In embodiments, the power center 100 can also verify the power requirements with the device, itself, via the communication link and/or broadcast capabilities. By doing so, the user can be assured that the proper power requirements are supplied to the connected portable electronic device. In addition, if necessary, the user will be able to customize the power delivery such as, for example, if the power center does not have explicit support for the portable electronic device.

As an example, a power center tip "A" fits device "X" and device "Y". Device "X" requires 16 volts and 3.36 amps; whereas, device "Y" requires 14 volts and 4 amps. In a first instance, the user of device "X" finds the appropriate tip (tip "A") and plugs it into the device. In one example, the system of the present invention reads the unique identifier from the tip connector to verify a location of the connected device "X". In embodiments, this verification can also be accomplished via a low RF signal transmitted between the power station and the device "X". In this embodiment, ideally, only device "X" will be within range of the RF source in order to transmit its make and model and location to the power center.

The device "X" can broadcast its power requirements to the power center via a communication link. The power center 100, once it receives this information can verify such information with the device, itself, or via the internal or external database. After verification, the power center 100 can begin supplying 16 V and 3.36 A.

At a later time, the user of laptop "X" disconnects and the user of laptop "Y" connect to the same tip (tip "A"). This time, laptop "Y" broadcasts its power specifications for the same power center connectors' unique identifier and the power center begins delivering 14V and 4 amps.

It should be understood that the make and model of the portable device is not a required element for successful implementation of the embodiment discussed herein; although, this information can be useful as a method to look up bulletins, factory recalls, manufacturer updates for fine tuning adjustments to powering the device or to obtain and verify the power requirements, itself. In one example, a manufacturer, for example, might publish, via a web service, a warning that model "XYZ" has a fire hazard risk if a certain voltage at a certain amperage is supplied for more than a certain time period. The power center 100 could then query the web service and supply a modified version of voltage and amperage according to the manufacturer's specification.

Validation of Matching Pairs Method

In further embodiments, the power center 100 can verify the make, model and other requirements of the portable electronic device, based in part or whole, on the unique identifier. Thus, in this embodiment, only a unique identifier of the laptop is necessary.

More particularly, once a tip is inserted into the device, a validation is made to ensure that the tip's associated power specifications meet the device's power requirements. In this implementation, each tip has a static power specification and will deliver only that power no matter how many devices can physically accept the connection.

In this embodiment, for example, the power center 100 includes a look-up table which is used to match tips and devices according to the power specification. Illustratively, there are four tips that are identical in size and shape but each with their own power specification. Tips A, B, C and D all have the same physical dimensions with tip A carrying a 16V 3.36 Amp power source and tip B carrying a 14V 4 Amp power source. Even though tip B will fit into device "X" (extending the previous example) the power center will not deliver power using that tip because the validation process failed to show a proper match.

User Input and Identification Method

In embodiments, the power center includes an interface 114 such as a touch screen LCD display or other display device to present to the user. The interface can then be used to request and/or control power specifications for any given device. In this embodiment, the interface could be connected to the power center 100 or could be logically connected to the portable electronic device, itself, via a wireless protocol such as 802.11b. The interface 114 may also be connected to the network and/or the database. In the former scenario, a preferred embodiment would include a touch screen device which the user could access and navigate to select a power requirement for a particular device. In the second scenario, the interface would be accessible via a web interface and 802.11b interface, and be displayed on the users own device.

Alternately, technologies such as Universal Plug and Play are also contemplated by the present invention. In this method, the user would navigate a user interface, and identify (i) the cord and tip they are using and (ii) the device make and model. These two elements will be evaluated by the power center 100 and database and then the requested power requirements will be delivered to that power cable tip.

By way of illustration and extending the prior example, the user of device "X" would connect the device to the power center, navigate the interface (via web browser or touch screen) and select the make and model of the device. Then the power center would look up that make and model and inform the user which cables would fit the device. The user of device "X" would then find a cable marked appropriately, connect that cable and then identify that cable to the power center 100, after which the power center 100 would begin supplying power through that identified power cord.

In an alternate embodiment, all the power cords could have interchangeable tips, i.e., tips which are either included with the power center or owned by the user. In this embodiment, the interface 114 would change accordingly to match the tip rather than the power cord. In either embodiment, the connector or the power cord could have specific wiring circuitry in order to specify to the power center exactly the specific voltage and amperage that must be delivered to the device.

In still further embodiments, the feature of the embodiments can be combined to provide further advantages to the user. For example, the user may use the interface 114 to verify or change the power requirements which were previously broadcast to the power center 100.

Universal Adapter

Figure 3A:
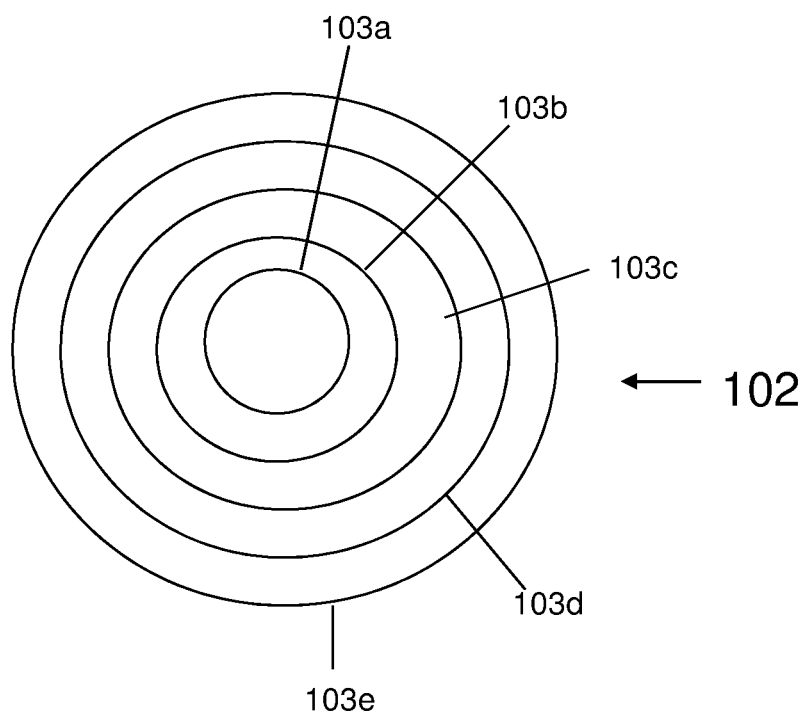
FIGS. 3a and 3b show respective views of a universal tip in accordance with an embodiment of the invention.
Figure 3B:
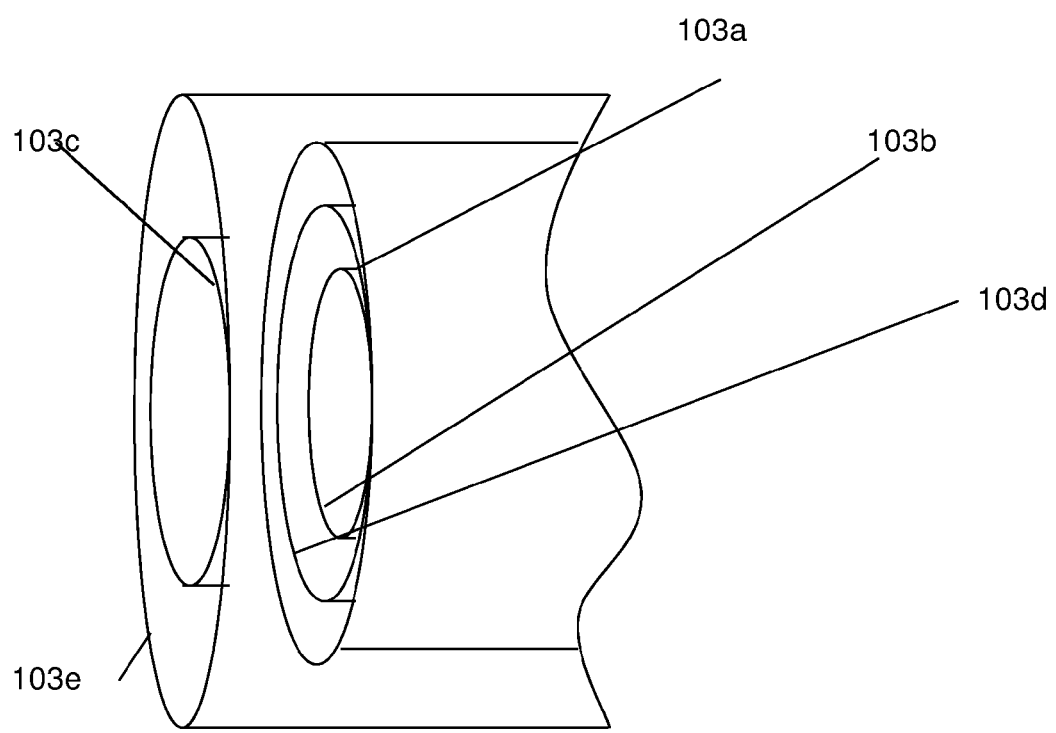

FIGS. 3*a* and 3*b* show a universal tip which may be used in combination with the above embodiments. In this embodiment, the universal tip is configured to connect to several different devices, across different physical requirements. In particular, as shown in FIG. 3*a*, the universal tip 102 is a barrel tip having several spring loaded rings or partial rings 103*a*-103*e*. It should be understood that different configurations are also contemplated by the invention such as, for example, more or less than five rings or partial rings.

In any event, as shown in FIG. 3*b*, any of the spring loaded rings 103*a*-103*e* are configured to be pushed backwards upon connecting to a portable electronic device, depending on the physical dimensions of the connection of the portable electronic device. For example, if spring loaded ring 103*c* was needed for the connection to device "X", the rings 103*a*, 103*b* and 103*d* would automatically be pushed backward upon connection to the portable electronic device since there would be physical interference. In this manner, one tip can be used for many different physical connection requirements.

While the invention has been described in terms of embodiments, those skilled in the art will recognize that the invention can be practiced with modifications and in the spirit and scope of the appended claims.

What is claimed is:

1. A method of delivering power to an electronic device, comprising:
   receiving, by a power center, a broadcast transmitted by the electronic device, the broadcast including a unique identification of a power tip;
   verifying the unique identification and connection location of the electronic device;
   determining power requirements for the electronic device based on the unique identification and connection location; and
   delivering power to the electronic device based on the determined power requirements,
   wherein:
      the broadcast is transmitted after connection of the power center to the electronic device via the power tip; and
      the broadcast further includes (i) make and model of the electronic device, (ii) voltage requirements, and (iii) amperage requirements.

2. The method of claim 1, further comprising accessing a database, via a communication link, to determine the power requirements.

3. The method of claim 1, wherein the unique identification identifies or pairs the power tip with the make and model of the electronic device.

4. The method of claim 1, further comprising at least one of creating, maintaining and supporting a computer infrastructure that performs the steps of claim 1.

5. The method of claim 1, wherein the power tip is a universal adapter configured for a plurality of electronic devices having different physical power connection characteristics.

6. The method of claim 1, further comprising providing a look-up table in a database to determine the power requirements of the electronic device.

7. The method of claim 1, further comprising looking up at least one of a plurality of bulletins, factory recalls and manufacturer updates for fine tuning adjustments to powering the portable electronic device.

8. The method of claim 1, further comprising providing an interactive mechanism configured for a user to manually enter power specifications for given electronic device.

9. The method of claim 1, wherein the broadcast is received via a wireless network connection using an RF source.

10. The method of claim 1, wherein the broadcast is received via a wired network connection.

11. The method of claim 1, wherein the broadcast is received via a serial connection.

12. The method of claim 1, wherein the broadcast is received via a power supply cord.

13. A method for providing a power supply to an electronic device, comprising:
   providing a computer infrastructure being operable to:
      receive one or more broadcasts transmitted by the electronic device, the one or more broadcasts including a unique identification of a power tip;
      verify the unique identification and connection location of the electronic device;
      determine power requirements for the electronic device based on the verified unique identification and connection location; and
      deliver power to the electronic device based on the determined power requirements,
   wherein:
      the power supply receives the one or more broadcasts transmitted by the electronic device after the power tip is connected to the electronic device;
      the power supply includes a plurality of connection locations having respective RF sources;
      the plurality of connection locations include the connection location of the electronic device; and
      the computer infrastructure is operable to:
         receive the one or more broadcasts transmitted by the electronic device using the respective RF source of the connection location of the electronic device; and
         verify the connection location of the electronic device by transmitting an RF signal to the electronic device.

14. A method of delivering power to an electronic device, comprising:
   receiving, by a power center, a broadcast transmitted by the electronic device, the broadcast including a unique identification of a power tip;
   verifying the unique identification and connection location of the electronic device;
   determining power requirements for the electronic device based on the unique identification and connection location; and
   delivering power to the electronic device based on the determined power requirements,
   wherein:
      the power center receives the broadcast transmitted by the electronic device after the power tip is connected to the electronic device;
      the power center includes a plurality of connection locations having respective RF sources;
      the plurality of connection locations include a connection location of the electronic device;
      the receiving the broadcast transmitted by the electronic device comprises receiving the broadcast using the respective RF source associated with the connection location of the electronic device; and
      the verifying the connection location of the electronic device comprises transmitting an RF signal to the electronic device.

* * * * *